(12) United States Patent
Mizenko et al.

(10) Patent No.: US 9,949,168 B2
(45) Date of Patent: Apr. 17, 2018

(54) RELIABLE DATA CHANNEL OVER PERIODIC DISCOVERY MESSAGES

(71) Applicant: QUALCOMM Incorporated, San Diego, CA (US)

(72) Inventors: Todd Mizenko, Yardville, NJ (US); James Kelleman, Easton, PA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 14/864,733

(22) Filed: Sep. 24, 2015

(65) Prior Publication Data

US 2017/0094493 A1    Mar. 30, 2017

(51) Int. Cl.
*H04W 28/06* (2009.01)
*H04W 8/00* (2009.01)
*H04W 84/18* (2009.01)
*H04L 1/00* (2006.01)

(52) U.S. Cl.
CPC ......... *H04W 28/065* (2013.01); *H04W 8/005* (2013.01); *H04L 1/00* (2013.01); *H04W 84/18* (2013.01)

(58) Field of Classification Search
CPC ......... H04L 29/06136; H04L 29/08477; H04L 67/108; H04L 69/166; H04W 8/005; H04W 28/065
See application file for complete search history.

(56) References Cited

U.S. PATENT DOCUMENTS

| | | | |
|---|---|---|---|
| 7,543,049 | B2 | 6/2009 | Fabre et al. |
| 7,924,761 | B1 | 4/2011 | Stevens |
| 8,060,017 | B2 | 11/2011 | Schlicht et al. |
| 8,879,613 | B1 | 11/2014 | Hui et al. |
| 2009/0067551 | A1 | 3/2009 | Chen et al. |
| 2012/0011247 | A1 | 1/2012 | Mallik et al. |
| 2014/0152476 | A1* | 6/2014 | Oggier ............... H03M 13/373 341/94 |

(Continued)

OTHER PUBLICATIONS

Siikavirta S., et al., "Reed-Solomon Feasibility in Mobile Transport," International Conference on Cyber-Enabled Distributed Computing and Knowledge Discovery, 2009, pp. 363-368.

(Continued)

*Primary Examiner* — Ashley Shivers
(74) *Attorney, Agent, or Firm* — Arent Fox, LLP

(57) ABSTRACT

A method, an apparatus, and a computer-readable medium for wireless communication are provided. In one aspect, an apparatus includes a processor configured to encode user data into a set of data fragments and to transmit each data fragment of the set of data fragments in a plurality of discovery messages. In another aspect, the apparatus includes a processor configured to receive one or more discovery messages, determine whether each of the received one or more discovery messages includes an encoded data fragment of a set of encoded data fragments associated with user data, determine whether a minimum number of encoded data fragments have been received from the received one or more discovery messages to enable reconstruction of the user data, and reconstruct the user data based on the determination of whether the minimum number of encoded data fragments is received.

30 Claims, 9 Drawing Sheets

(56) References Cited

U.S. PATENT DOCUMENTS

| | | |
|---|---|---|
| 2014/0206286 A1 | 7/2014 | Palin et al. |
| 2015/0256992 A1 | 9/2015 | Kelleman et al. |
| 2016/0165013 A1* | 6/2016 | Agiwal ................ H04B 7/2656 370/349 |
| 2016/0165653 A1* | 6/2016 | Liu ..................... H04W 76/023 370/329 |
| 2016/0246677 A1* | 8/2016 | Sangamkar ......... G06F 11/1076 |

OTHER PUBLICATIONS

International Search Report and Written Opinion—PCT/US2016/049256—ISA/EPO—Nov. 29, 2016.

TSG-SA WG4: "3GPP TS 26.346 Version 2.0.0 Multimedia Broadcast/Multicast Service; Protocols and Codecs", Release 6, 3GPP Draft; SP-050082, 3rd Generation Partnership Project (3GPP), Mobile Competence Centre; 650, Route Des Lucioles; F-06921 Sophia-Antipolis Cedex; France, vol. TSG SA, no. Tokyo, Japan; Mar. 7, 2005, Mar. 7, 2005 (Mar. 7, 2005), 78 Pages, XP050204306 [retrieved on Mar. 7, 2005] cited in the application.

* cited by examiner

RELIABLE DATA CHANNEL OVER PERIODIC DISCOVERY MESSAGES

BACKGROUND

Field

The present disclosure relates generally to communication systems, and more particularly, to providing a reliable data channel over periodic discovery messages.

Background

In many telecommunication systems, communications networks are used to exchange messages among several interacting spatially-separated devices. Networks may be classified according to geographic scope, which could be, for example, a metropolitan area, a local area, or a personal area. Such networks could be designated respectively as a wide area network (WAN), metropolitan area network (MAN), local area network (LAN), wireless local area network (WLAN), personal area network (PAN), or a neighbor awareness network (NAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer program products, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

One aspect of this disclosure provides an apparatus for wireless communication. The apparatus is configured to encode user data into a set of data fragments. The apparatus is configured to transmit each data fragment of the set of data fragments in a plurality of discovery messages.

Another aspect of this disclosure provides an apparatus for wireless communication. The apparatus includes means for encoding user data into a set of data fragments. The apparatus includes means for transmitting each data fragment of the set of data fragments in a plurality of discovery messages. In an aspect, the set of data fragments may include a subset of user data fragments and a subset of repair data fragments. The user data may be of size S, the set of data fragments may have n fragments, the subset of user data fragments may have k fragments, and the subset of repair data fragments may have r fragments such that k+r=n. In another aspect, the encoded user data may be of size S', and $$S' = S + \left(S \times \frac{r}{k}\right).$$

In another aspect, the plurality of discovery messages may be a set of n discovery messages, and all of the encoded user data may be transmitted after the set of n discovery messages is transmitted. In another aspect, each discovery message of the plurality of discovery messages may include a set of encoding parameters associated with the encoded user data. In another aspect, the plurality of discovery messages may enable discovery of a network or of a service within the network. In another aspect, the plurality of discovery messages may be transmitted periodically and the plurality of discovery messages may be beacon frames. In another aspect, the user data may be encoded using erasure codes. In another aspect, the means for transmitting may be configured to transmit each data fragment by inserting each data fragment into an information element and by transmitting the information element containing the data fragment in a discovery message. In another aspect, the information element may be a vendor specific attribute information element.

Another aspect of this disclosure provides for a computer-readable medium associated with a wireless device and storing computer executable code for wireless communication. In this aspect, the computer-readable medium includes code for encoding user data into a set of data fragments and for transmitting each data fragment of the set of data fragments in a plurality of discovery messages. In an aspect, the set of data fragments may include a subset of user data fragments and a subset of repair data fragments. The user data may be of size S, the set of data fragments may have n fragments, the subset of user data fragments may have k fragments, and the subset of repair data fragments may have r fragments such that k+r=n. In another aspect, the encoded user data may be of size S', and $$S' = S + \left(S \times \frac{r}{k}\right).$$

In another aspect, the plurality of discovery messages may be a set of n discovery messages, and all of the encoded user data may be transmitted after the set of n discovery messages is transmitted. In another aspect, each discovery message of the plurality of discovery messages may include a set of encoding parameters associated with the encoded user data. In another aspect, the plurality of discovery messages may enable discovery of a network or of a service within the network. In another aspect, the plurality of discovery messages may be transmitted periodically and the plurality of discovery messages may be beacon frames. In another aspect, the user data may be encoded using erasure codes. In another aspect, the code for transmitting may include code for transmitting each data fragment by inserting each data fragment into an information element and by transmitting the information element containing the data fragment in a discovery message. In another aspect, the information element may be a vendor specific attribute information element.

Another aspect of this disclosure provides an apparatus for wireless communication. The apparatus is configured to receive one or more discovery messages. The apparatus is configured to determine whether each of the received one or more discovery messages includes an encoded data fragment of a set of encoded data fragments associated with user data. The apparatus is configured to determine whether a minimum number of encoded data fragments have been received from the received one or more discovery messages to enable reconstruction of the user data. The apparatus is configured to reconstruct the user data based on the determination of whether the minimum number of encoded data fragments is received.

Another aspect of this disclosure provides an apparatus for wireless communication. The apparatus includes means for receiving one or more discovery messages. The apparatus includes means for determining whether each of the received one or more discovery messages includes an encoded data fragment of a set of encoded data fragments associated with user data. The apparatus includes means for determining whether a minimum number of encoded data fragments have been received from the received one or more discovery messages to enable reconstruction of the user data. The apparatus includes means for reconstructing the user data based on the determination of whether the minimum number of encoded data fragments is received. In an aspect, the set of encoded data fragments may include a subset of user data fragments and a subset of repair data fragments. In this aspect, the user data may be of size S, the set of encoded data fragments may have n fragments, the subset of user data fragments may have k fragments, and the subset of repair data fragments may have r fragments such that k+r=n, and the minimum number of encoded data fragments may be less than n. In another aspect, each discovery message of the one or more discovery messages may include a set of encoding parameters associated with the set of encoded data fragments. In another aspect, the one or more discovery messages may be received periodically, and the one or more discovery messages may be beacon frames. In another aspect, the means for reconstructing the user data may be configured to reconstruct the user data by combining each of the encoded data fragments in the received one or more discovery messages and by decoding the combined encoded data fragments to reconstruct the user data. In another aspect, the one or more discovery messages may enable discovery of a network or of a service within the network.

Another aspect of this disclosure provides for a computer-readable medium associated with a wireless device and storing computer executable code for wireless communication. In this aspect, the computer-readable medium includes code for receiving one or more discovery messages, determining whether each of the received one or more discovery messages includes an encoded data fragment of a set of encoded data fragments associated with user data, determining whether a minimum number of encoded data fragments have been received from the received one or more discovery messages to enable reconstruction of the user data, and reconstructing the user data based on the determination of whether the minimum number of encoded data fragments is received. In another aspect, each discovery message of the one or more discovery messages may include a set of encoding parameters associated with the set of encoded data fragments. In another aspect, the one or more discovery messages may be received periodically, and the one or more discovery messages may be beacon frames. In another aspect, the code for reconstructing the user data may include code for combining each of the encoded data fragments in the received one or more discovery messages and for decoding the combined encoded data fragments to reconstruct the user data. In another aspect, the one or more discovery messages may enable discovery of a network or of a service within the network.

DETAILED DESCRIPTION

Figure 1:
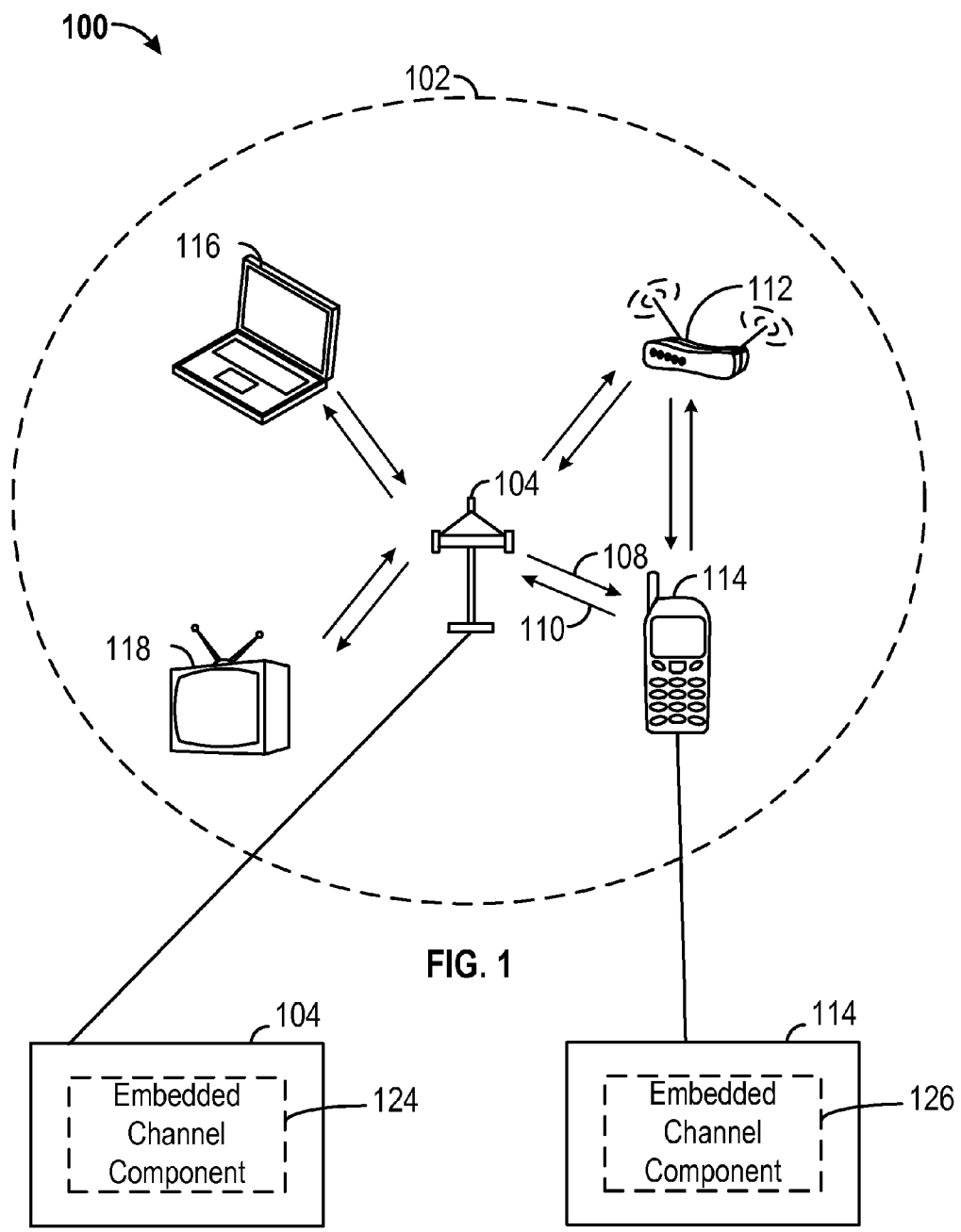
FIG. 1 shows an example wireless communication system in which aspects of the present disclosure may be employed.

Various aspects of the novel systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of WLANs. A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations a station may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system.

Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the AP 104 may include one or more components for performing various functions. For example, the AP 104 may include an embedded channel component 124 configured to perform procedures related to using an embedded channel to transmit user data over discovery messages. In one configuration, the embedded channel component 124 may be configured to encode user data into a set of data fragments and to transmit each data fragment of the set of data fragments in a number of discovery messages. In another configuration, the embedded channel component 124 may be configured to receive one or more discovery messages, determine whether each of the received one or more discovery messages includes an encoded data fragment of a set of encoded data fragments associated with user data, determine whether a minimum number of encoded data fragments have been received from the received one or more discovery messages to enable reconstruction of the user data, and reconstruct the user data based on the determination of whether the minimum number of encoded data fragments is received.

In another aspect, the STA 114 may include one or more components for performing various functions. For example, the STA 114 may include an embedded channel component 126 configured to perform procedures related to using an embedded channel to transmit user data over discovery messages. In one configuration, the embedded channel component 126 may be configured to encode user data into a set of data fragments and to transmit each data fragment of the set of data fragments in a number of discovery messages. In another configuration, the embedded channel component 126 may be configured to receive one or more discovery messages, determine whether each of the received one or more discovery messages includes an encoded data fragment of a set of encoded data fragments associated with user data, determine whether a minimum number of encoded data fragments have been received from the received one or more discovery messages to enable reconstruction of the user data, and reconstruct the user data based on the determination of whether the minimum number of encoded data fragments is received.

In a Wi-Fi network, AP devices may periodically transmit beacon frames (e.g., every 100 ms). In a Wi-Fi NAN cluster, a subset of participating NAN devices may periodically transmit beacon frames (e.g., every 512 ms). In both cases, the transmitted beacon frames provide time synchronization and announce the presence of the network or the NAN cluster to enable other devices to discover and join the network/NAN cluster. In addition to beacon frames, NAN devices may periodically transmit separate service discovery frames (e.g., every 512 ms) to announce the availability of a particular service within the cluster. In NAN, services may be identified by a 48-bit value called a service identifier (ID). The service ID may be included in a service discovery frame. A small variable number of additional bytes of service-specific information may also be attached and transmitted within service discovery frames.

A device that periodically publishes a service may continue doing so for an extended duration (e.g., hours, days, or indefinitely in the case of a Wi-Fi AP). Although discovery messages (e.g., service discovery message or beacon frames) are typically shorter in length so as not to create too much overhead in a network, discovery messages may have unused capacity because the information carried within the discovery message may be small. Further, the majority of content in discovery messages may remain constant over the extended duration, which may enable the unused capacity in discovery messages to be more easily predicted. As such, a need exists to efficiently utilize the unused space in discovery messages. In an aspect, the stream of transmitted discovery messages from a device may be a resource used to send additional pieces of information unrelated to the typical functionality of discovery messages (e.g., network or service discovery). Most data to be transmitted may be too large compared with the available space in discovery messages. A simple scheme of fragmenting the data into smaller pieces and transmitting them over numerous consecutive messages is less than ideal because the low likelihood that a nearby device will be able to receive all the fragmented messages. As further discussed below, devices that periodically transmit discovery messages may utilize a data channel to convey larger pieces of data reliably using erasure codes (or other encoding techniques).

A data channel may be inserted into discovery messages using supplemental information elements (IEs) in combination with erasure coding techniques (e.g., RaptorQ™ or Reed-Solomon). The data rate of the data channel may be subject to the rate of various discovery messages (or other periodic messages). In an aspect, the data rate may be slower than typical Wi-Fi data channels or messages not used for discovery purposes but rather used for data communication. An erasure encoder may be used by a transmitting device to generate fragments of encoded source data, which are then inserted into the periodic discovery messages. An erasure decoder may be used by the receiving device to reliably reconstruct the source data from the received fragments which may be extracted from the periodic discovery messages. The data generated by the encoder may be contained in IEs that may be part of or added to periodic discovery messages. The IE may also include information about the data such as the encoding parameters used to reconstruct the source data.

In an aspect, erasure encoders may take source data of size S and encode the data into k+r=n fragments, where k fragments contain the actual source data and r fragments contain repair data. The size of the encoded data S' may be equal to S plus the repair fragment overhead, which is $$S \times \frac{r}{k},$$

or $$S' = S + \left(S \times \frac{r}{k}\right) \quad \text{(Eq. 1)}$$

The repair fragments may be used when some number of source fragments is missed or otherwise unavailable due to network congestions, etc. As such, the receiving device may not need all of the fragments to reliably reconstruct the data. In this case, the encoding parameters use to reconstruct the source data may include n, k, and r.

Figure 2:
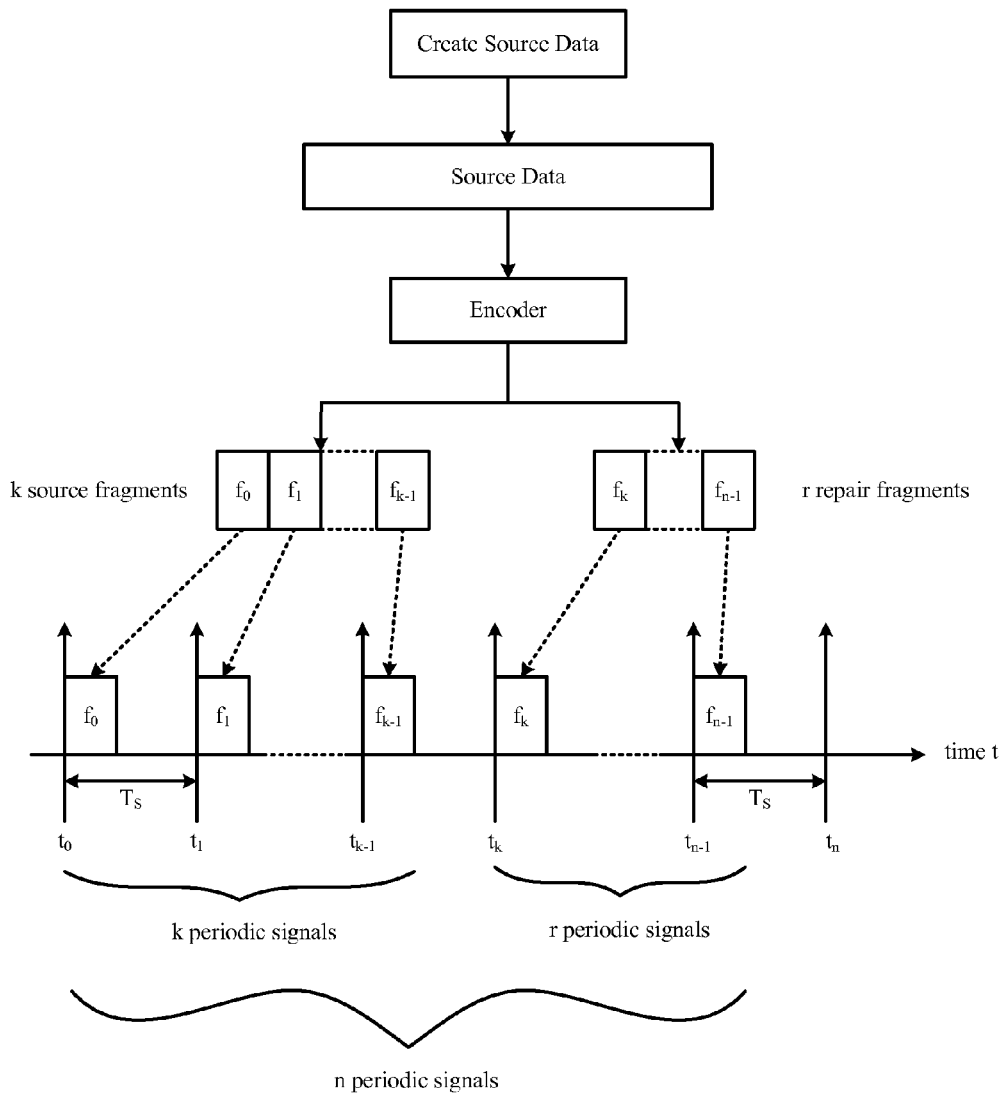
FIG. 2 is a diagram of a method for fragmenting data for inclusion into discovery messages.

FIG. 2 is a diagram 200 of a method for fragmenting data for inclusion into discovery messages. Referring to FIG. 2, a wireless device (e.g., a STA, an AP, or any electronic device such as a printer, point-of-sale device, refrigerator, alarm system, etc.) may create source data for transmission based on an application or a process on the wireless device. The source data may be of size S. The source data may be passed into an erasure encoder, which may encode the source data into a set of n data fragments, k of which are user data fragments and r of which are repair data fragments, such that n=k+r. The encoded user data may be of size S', such that $$S' = S + \left(S \times \frac{r}{k}\right).$$

Each data fragment may have a size $$\left(\frac{S}{k}\right).$$

The wireless device may periodically transmit discovery messages (e.g., service discovery messages or beacon frames) with period $T_S$. Each data fragment of the n data fragments may be packaged into an IE that may be attached to a periodic discovery message. In an aspect, the n data fragments are not used for or associated with discovery purposes (e.g., NAN discovery or service discovery). In another aspect, the transmission order of the data fragments may be based on an index from 0 to n−1 such that the data fragments are transmitted sequentially according to the numerical order of the indices. In another aspect, the data fragments may be transmitted in a different numerical order (e.g., randomly) so long as all n fragments are transmitted. In this aspect, devices may agree upon an order of transmission for the data fragments (e.g., fragment 1, fragment 5, fragment 6, etc.) or each data fragment may be transmitted with a fragment index number (e.g., a fragment index number may be included at the start of an IE such as in a fragment header or descriptor). The source data may be transmitted entirely after n periodic discovery messages are transmitted by the wireless device. In an aspect, the choices of n, k, and r as well as the symbol size and data fragment size may be optimized for the type of periodic message (e.g., a service discovery message or a beacon frame), a network technology, and source data. In an aspect, discovery messages with more available capacity may be able to transmit larger data fragment sizes. In another aspect, larger source data may be transmitted in larger data fragments, whereas smaller source data may be transmitted in smaller data fragments. Also, the selection of the type of discovery message to be used for transmitting data fragments may be based on a priority of the data to be transmitted or the throughput requirements of the data to be transmitted. Higher priority data or data with higher throughput requirements may be transmitted in discovery messages that are more frequently transmitted.

Referring to FIG. 2, k source fragments may be transmitted using k periodic signals, and r repair fragments may be transmitted using r periodic signals. The periodic signals may have a signal period of $T_S$. At periodic signal instance $t_0$, fragment $f_0$ may be transmitted. Then, after $T_S$, periodic signal instance $t_1$ may be transmitted and may contain fragment $f_1$, and so on. In an aspect, the source fragments may not be transmitted before repair fragments. In another aspect, source fragments and repair fragments may be transmitted in any order. In another aspect, the k periodic signals and the r periodic signals may be transmitted at different periodicities (e.g., a first periodicity and a second periodicity) by using different types of discovery messages (e.g., service discovery frames or beacon frames).

The use of discovery messages to implement a low-rate data channel may be illustrated, but is not limited, by a NAN network example. A NAN network, for example, operates around a recurring interval and window used to discover other devices and services, referred to respectively as the discovery interval (DI) and discovery window (DW). The DI may have a period of 512 time units (TUs), and 1 TU may be approximately 1024 µs. The DW may be 16 TUs in length and may occur at the start of the DI.

A NAN network master device (e.g., a device in charge of supplying synchronization to the NAN network such as an AP) may transmit a periodic sync beacon (SB) signal and/or a periodic discovery beacon (DB) signal to help other devices discovery the network and maintain synchronization. In an aspect, the SB may be transmitted within a DW of a DI, and the DB may be transmitted within a DI. The interval between transmitting SBs may be 512 TUs, and the interval between transmitting DBs may be greater than 50 TUs and less than 200 TUs (e.g., 100 TUs). In an aspect, 3 DBs may be sent per DI when operating in a single band mode (e.g., 2.4 GHz). SBs may be up to 128 bytes in length and may contain 67 bytes of data. DBs may be up to 350 bytes in length and may contain 100 bytes of data. In an aspect, 32 bytes of the remainder may be available in SBs and 128 bytes of the remainder may be available in DBs for use as a low-rate embedded data channel. In an aspect, a vendor specific attribute (VSA) information element (IE) may be used to transmit data in the beacons based on the remaining available space. In another aspect, a standard specified attribute may be used instead. In another aspect, a service specific information (SSI) field may be used to transmit data in beacons. The SSI field may have 255 bytes, for example, and a portion of the 255 bytes may be used to transmit data.

To transmit source data in SBs or DBs, different encoding parameters may be selected. In one configuration, for SBs, encoding parameters n=128, k=96, and r=32 may be selected. These parameters may allow the channel to reliably transmit a total of 3,072 source bytes (e.g., 96*32) with 1,024 repair bytes (e.g., 32*32). In an overall period of 128 DIs (e.g., a little longer than a minute), the data channel may transmit a total of 3,072 bytes of user payload. In another configuration, for DBs, encoding parameters n=384, k=288, r=96 may be selected. These parameters may allow the channel to reliably transmit 36,864 source bytes (e.g., 288*128) with 12,288 bytes (e.g., 96*128) transmitted as repair bytes. In an overall period, of 128 DIs, the data channel may transmit a total of 36,864 bytes of user payload.

Devices in a NAN network may also send periodic service discovery (SD) messages that convey information about services that are available (e.g., published) or desired (e.g., subscription requested). In an aspect, SD messages may be transmitted within a DI. Similar to SBs, the interval between transmitting SD messages may be 512 TUs. Assuming a 6 megabits per second (Mbps) data rate, SD messages may be up to 300 bytes in length and may contain a minimum of 42 bytes of data. Therefore, 128 bytes of the remainder may be dedicated to the low-rate embedded data channel using either service-specific information (SSI) or a VSA IE. Also, for SD messages, encoding parameters n=128, k=96, and r=32 may be selected. These parameters may enable the channel to reliably transmit a total of 12,288 source bytes (e.g., 96*128) with 4,096 bytes (e.g., 32*128) transmitted as repair bytes. In an overall period of 128 DIs, the data channel may therefore transmit a total of 12,288 bytes of user payload.

Figure 3:
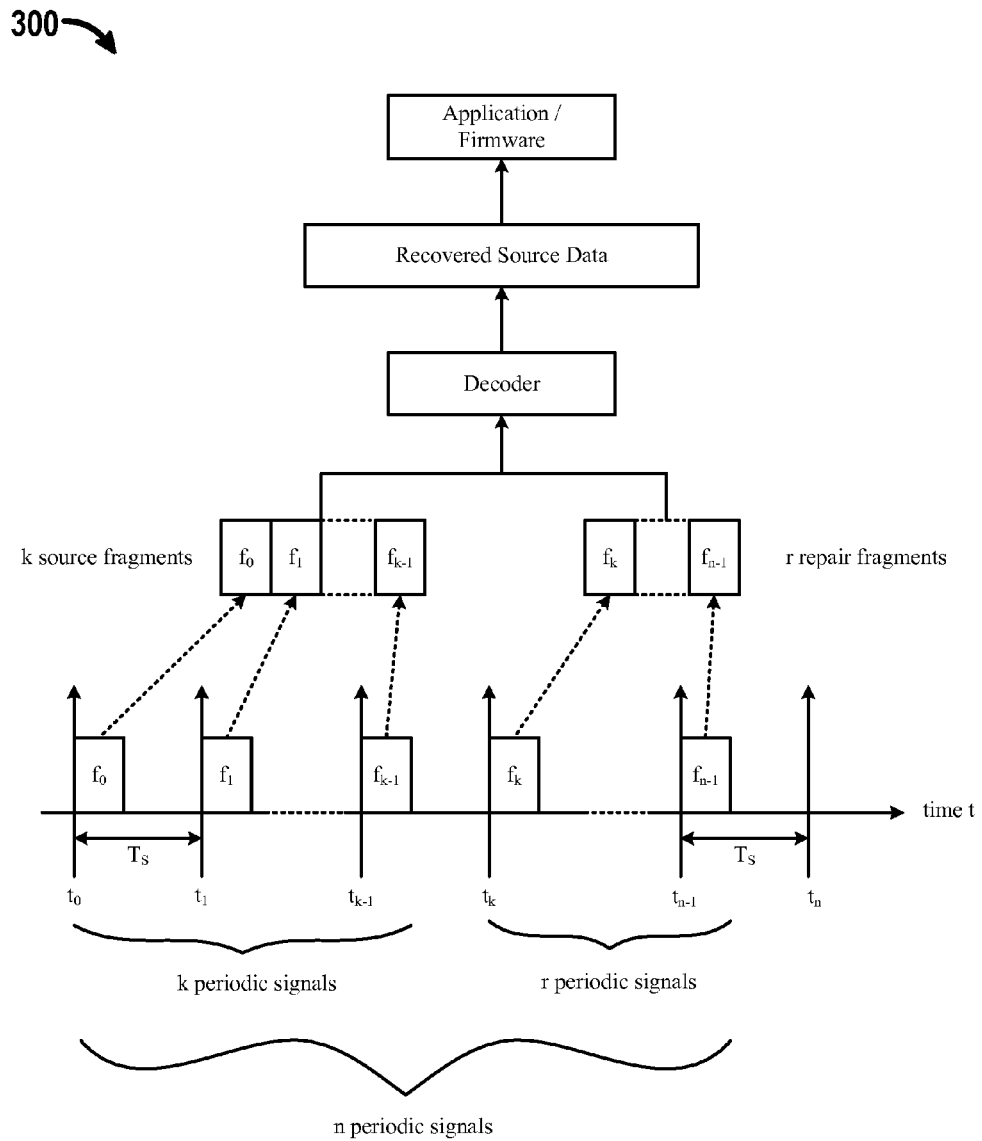
FIG. 3 is a diagram of a method for decoding fragmented data from discovery messages.

FIG. 3 is a diagram 300 of a method for decoding fragmented data from discovery messages. Referring to FIG. 3, a wireless device (e.g., a STA, an AP, or any electronic device) may periodically receive discovery messages with period $T_S$ from another wireless device. The discovery messages may include fragments of source data of size S as discussed in FIG. 2. The source data may be passed through an erasure encoder, which may encode the source data into a set of n data fragments, k of which may be used for user data fragments and r of which may be used for repair data fragments, such that n=k+r. In an aspect, the choices of n, k, and r may be transmitted in each IE as encoding parameters. The wireless device may examine each incoming periodic discovery message for supplemental IEs. When supplemental IEs are identified, the wireless device may pass data from the IE to an erasure decoder, if erasure encoding is used to fragment the data (other encoding/decoding methods may also be used). Once the minimum set of IEs is received, the decoder may reconstruct the entire data chunk for further processing by the wireless device. In an aspect, the minimum set of IEs may depend on the type of erasure coding being used. In some instances, assuming the source data has been fragmented in k source data fragments and r repair data fragments, receiving k to k+2 fragments may provide a high probability (e.g., 99%) of successfully decoding the source data. In other words, the wireless device may miss from r to r−2 IEs from n total and still reconstruct the source data. In one aspect, referring to FIG. 3, the wireless device may receive periodic signal instances $t_0, t_1, \ldots t_n$, and be able to recover/reconstruct the source data. In another aspect, the wireless device may receive periodic signals $t_0, t_1, \ldots t_{k-2}$, and $t_k \ldots t_{n-1}$, and be able to recover the source data. In yet another aspect, the wireless device may only receive $t_1$ and $t_2$ and not have enough fragments to be able to recover the source data. If the wireless device is able to recover the source data, the wireless device may provide the source data to an application for further processing.

Figure 4:
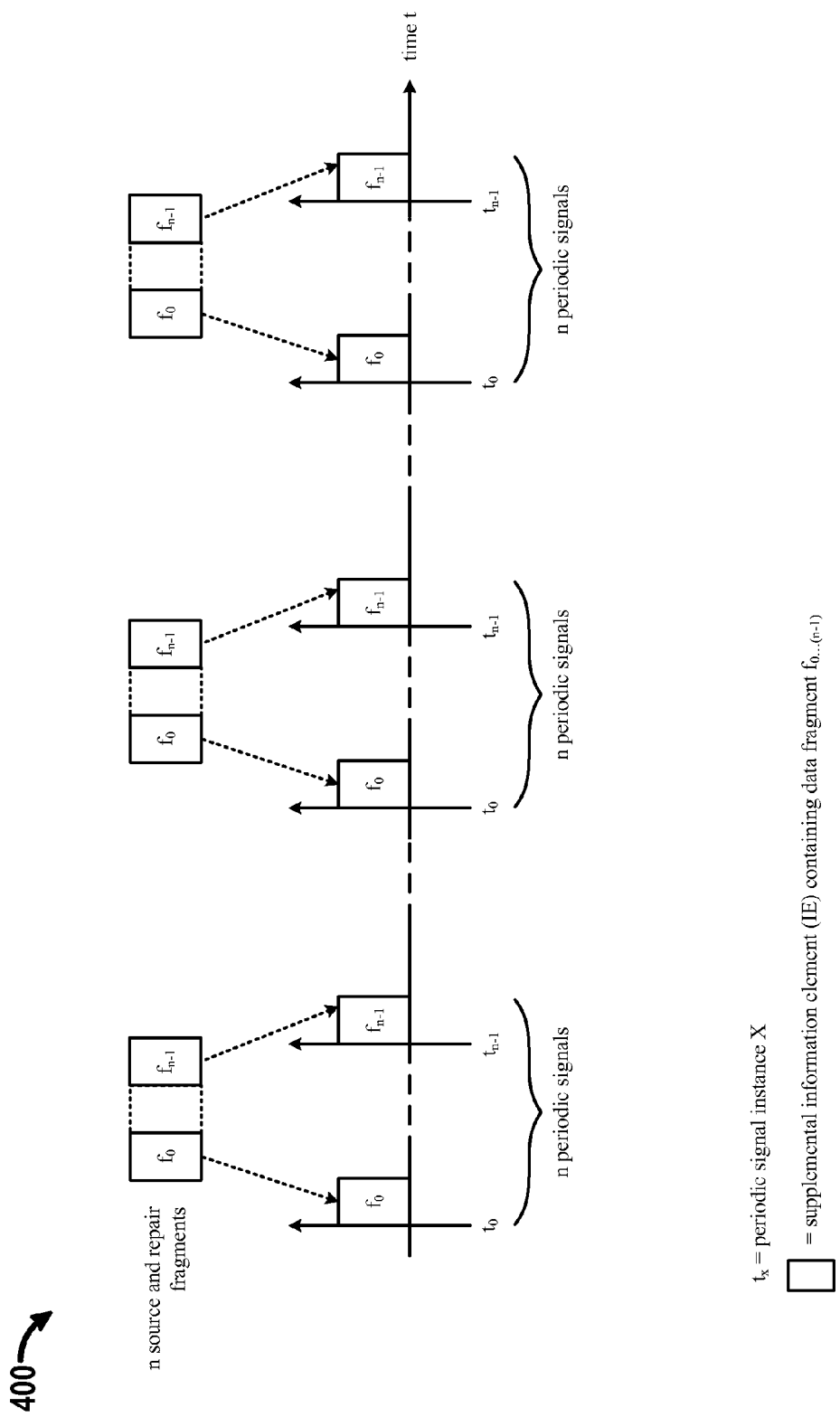
FIG. 4 is a diagram illustrating an operation of an embedded data channel over a period of time.

FIG. 4 is a diagram 400 illustrating an operation of an embedded data channel over a period of time. FIG. 4 illustrates three sets of periodical signals (e.g., discovery messages), each set having n periodic signals for a total of n×3 periodical signals. Each of the three sets of n may contain a different (or the same) chunk of source data packaged in supplemental IEs. Although FIG. 4 illustrates 3 sets of periodic signals, any number of sets of periodic signals may be utilized to transmit encoded source data in discovery messages. In an aspect, each IE may include the parameters (e.g., n, k, and r) used to reconstruct the source data. In another aspect, the parameters may be specified based on a discovery message type. For example, encoded data fragments in SBs may be encoded based on a first set of preconfigured parameters (e.g., n=128, k=96, r=32). Encoded data fragments in DBs may be encoded based on a second set of preconfigured parameters (e.g., n=384, k=288, r=96). Encoded data fragments in SDs may be encoded based on a third set of preconfigured parameters (e.g., n=128, k=96, r=32). In this aspect, each discovery message type may include a discovery message type indicator, and a device receiving the discovery message may know which parameters to use based on the discovery type indicator. In an aspect, a wireless device transmitting source data may select a different type of discovery message (e.g., SB, DB, SD, or another type of discovery message) to achieve or satisfy a different bit rate requirement with respect to the embedded data channel. For example, higher priority data may utilize a higher bit rate (e.g., DBs may support higher bit rates), whereas lower priority data may utilize a lower bit rate (e.g., SBs may support lower bit rates compared to DBs).

Wireless devices receiving the discovery message may determine that the discovery message includes encoded data fragments based on the IE which carries the encoded data fragments. In one aspect, the IE may include an identifier field that indicates the presence of an encoded data fragment associated with source data that is being sent using periodic discovery messages. The identifier field may include an indicator that may be preconfigured or dynamically configured based on network settings (e.g., settings in a NAN). The value of the indicator may indicate whether the IE has data fragments associated with user data (e.g., an indicator in identifier field may be set to 0 if no encoded data fragment is being transmitted with the discovery message, or the indicator may be set to 1 if an encoded data fragment is being transmitted with the discovery message). In another aspect, the IE may be a VSA IE. Devices that support a VSA IE from a particular vendor may know to search for the VSA IE (e.g., based on a vendor specific identifier) and determine whether the VSA IE includes encoded data fragments.

Figure 5:
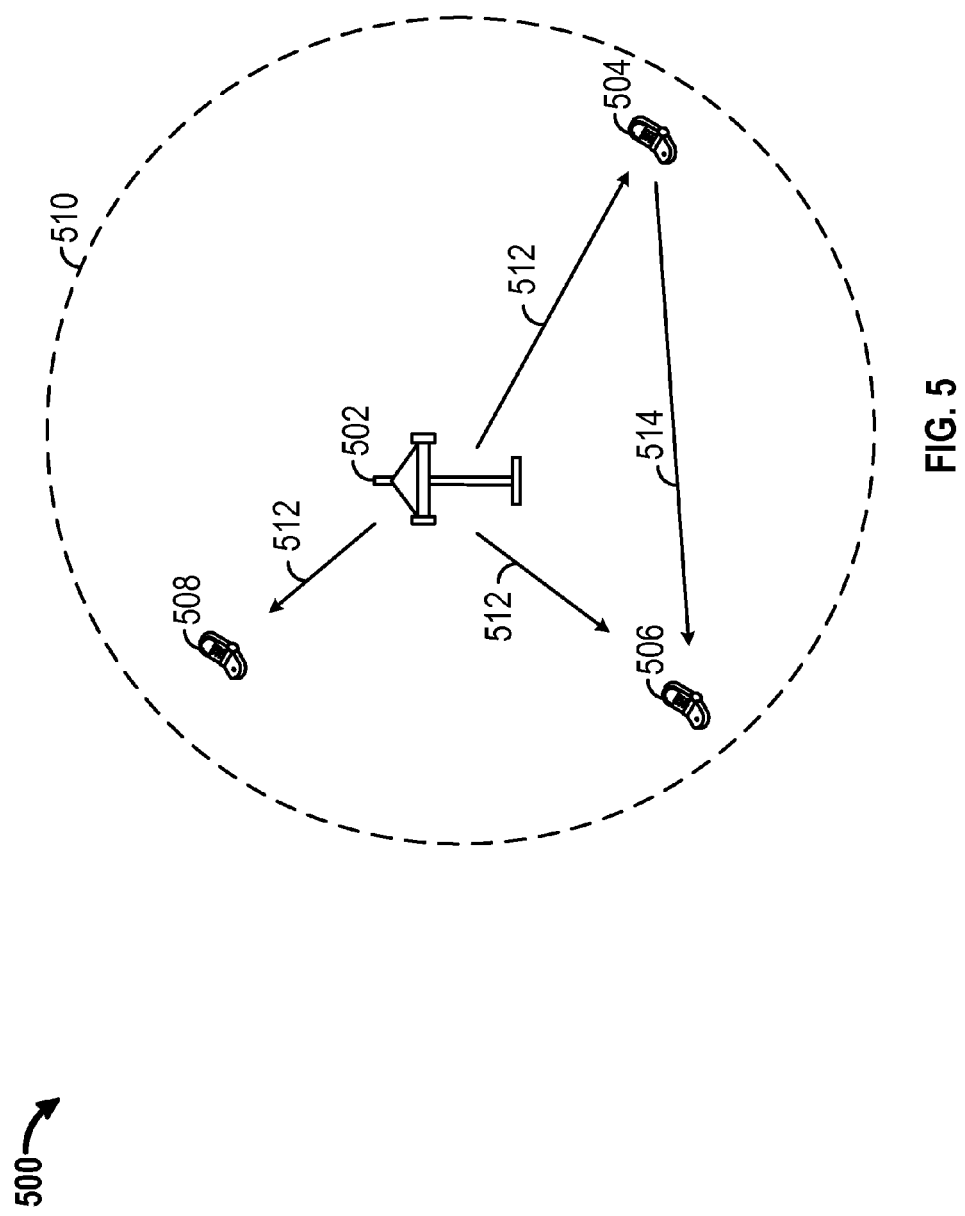
FIG. 5 is an exemplary diagram of a method of utilizing an embedded data channel in discovery messages within a wireless network (e.g., a NAN).

FIG. 5 is an exemplary diagram 500 of a method of utilizing an embedded data channel in discovery messages within a wireless network (e.g., a NAN). Referring to FIG. 5, an AP 502, a first STA 504, a second STA 506, and a third STA 508 may be associated with a NAN 510. In an aspect, the AP 502 may be a master device within the NAN 510 that transmits SB and DB signals to help other members (e.g., the first, second, or third STAs 504, 506, 508) to discover the NAN 510 and maintain synchronization with the NAN 510. In an aspect, the NAN 510 may be within a university campus and the AP 502 may have user data (e.g., class information such as class schedules or other user data) to transmit. In another aspect, the AP 502 may transmit a device dictionary/listing, which may list all the wireless devices publishing or actively subscribing to a service within the NAN 510. In another aspect, the AP 502 may transmit device-to-resource mapping links (e.g., a uniform resource locator or an Internet protocol address). In another aspect, the NAN 510 may transmit a list of recently connected (e.g., within the past hour) NAN devices or service IDs (e.g., within a sync beacon or a service discovery beacon). The AP 502 may encode the user data using erasure codes. In this aspect, the AP 502 may generate a set of data fragments based on the user data. The set of data fragments may include a subset of user data fragments and a subset of repair data fragments. Repair data fragments may be used to supplement any user data fragments that are received with error or not received. In an aspect, the user data may be of size S. The AP 502 may generate n data fragments, which may include k user data fragments in the subset of user data fragments and r repair data fragments in the subset of repair data fragments such that k+r=n. In another aspect, the size of the encoded user data may be S', and S' may be determined based on the equation $$S' = S + \left(S \times \frac{r}{k}\right),$$

where S is the size of the original user data, r is the number of repair data fragments, and k is the number of user data fragments.

The AP 502 may transmit the n data fragments in a first set of discovery messages 512 (e.g., a number of discovery messages). The first set of discovery messages 512 may be beacon messages (e.g., a sync beacon, a discovery beacon), service discovery messages, or any other types of discovery messages. The first set of discovery messages 512 may have n discovery messages, and each of the n discovery messages may transmit one of the n data fragments in any order (e.g., sequential order, random order). In an aspect, the first set of discovery messages 512 may be transmitted to the wireless devices within the NAN 510 (e.g., the first STA 504, the second STA 506, and the third STA 508).

In another aspect, each of the n discovery messages may include a set of encoding parameters associated with the data fragments that enable a device receiving the data fragments to reconstruct the user data. The set of encoding parameters may include the values n, k, and r.

In another aspect, each of the data fragments may be inserted into an IE. In an instance, the IE may include multiple fields such as a fragment field and an encoding parameters field. The encoding parameters field may indicate the encoding parameters (e.g., n, k, and r) associated with the encoded data fragment. The fragment field may include a fragment identifier (or fragment index number) that indicates where (e.g., which position) in the data fragment sequence (e.g., $f_0, \ldots, f_n$) the data fragment belongs. The IE may include an identifier field that indicates that the IE includes supplemental information in the form of data fragments of source data that is being transmitted over discovery messages. In another instance, the IE may be a VSA IE. Devices compatible with the VSA IE may know that the VSA IE contains data fragments. For example, the VSA IE may include a VSA IE type field that indicates the VSA IE contains data fragments for transmission over discovery messages. When the data fragments are inserted into an IE, various other IE fields may also be determined (e.g., encoding parameter field), and the IE may be transmitted to other devices in a discovery message.

Referring to FIG. 5, the first STA 504 may receive n discovery messages (or a subset of the n discovery messages) of the first set of discovery messages 512. The first STA 504 may determine whether each of the received n messages includes an encoded data fragment of a set of data fragments associated with user data. In an aspect, each discovery message may indicate that an encoded data fragment is included in the message. For example, if the discovery message includes an IE, the IE may have an identifier field or a type field that indicates the discovery message contains an encoded data fragment.

If the discovery message includes an encoded data fragment, the first STA 504 may extract the encoded data fragment from the discovery message. The first STA 504 may extract the encoded data fragment from the other received discovery messages of the first set of discovery messages 512. The first STA 504 may store the extracted and encoded data fragments. The first STA 504 may determine whether a minimum number of encoded data fragments have been received to enable reconstruction of the user data. In an aspect, the first STA 504 may determine whether a minimum number of encoded data fragments have been received based on the encoding parameters provided in each of the discovery messages. For example, if n, k, and r values are provided, the first STA 504 may determine whether at least k discovery messages with encoded data fragments have been received. The k discovery messages may include data fragments from the subset of user data fragments or from the subset of repair data fragments. In an aspect, if at least k discovery messages were not received, the first STA 504 may not attempt to reconstruct the user data. However, if at least k discovery messages are received, the first STA 504 may reconstruct the user data based on the received discovery messages. In an aspect, the first STA 504 may reconstruct the user data by combining at least the minimum number of extracted data fragments and decoding the combined data fragments to reconstruct the user data.

Referring to FIG. 5, the second STA 506 may receive k−3 discovery messages containing user data fragments and 5 additional discovery messages containing repair data fragments from the first set of discovery messages 512. In total, the second STA 506 may have received k+2 (e.g., k−3+5) discovery messages. The second STA 506 may determine whether each of the received discovery messages includes an encoded data fragment of a set of data fragments associated with user data. In an aspect, each discovery message may indicate that an encoded data fragment is included in the message. The second STA 506 may extract the encoded data fragment from each of the discovery messages in the first set of discovery messages 512. The second STA 506 may determine whether a minimum number of encoded data fragments have been received to enable reconstruction of the user data based on the encoding parameters provided in each of the discovery messages. For example, if n, k, and r values are provided, the second STA 506 may determine whether at least k discovery messages with encoded data fragments have been received. In this example, because k+2 discovery messages were received, the number of discovery messages received exceeds the minimum number of discovery messages needed to reconstruct the user data. The second STA 506 may reconstruct the user data based on the received discovery messages. In an aspect, the second STA 506 may reconstruct the user data by combining at least the minimum number of extracted data fragments and decoding the combined data fragments to reconstruct the user data.

Referring to FIG. 5, the third STA 508 may receive k–5 discovery messages containing user data fragments. The third STA 508 may not receive all of the discovery messages due to network congestion, for example. The third STA 508 may determine whether each of the received discovery messages includes an encoded data fragment of a set of data fragments associated with user data. In an aspect, each discovery message may indicate that an encoded data fragment is included in the message. The third STA 508 may extract the encoded data fragment from each of the discovery messages in the first set of discovery messages 512. The third STA 508 may determine whether a minimum number of encoded data fragments have been received to enable reconstruction of the user data based on the encoding parameters provided in each of the discovery messages. For example, if n, k, and r values are provided, the third STA 508 may determine whether at least k discovery messages with encoded data fragments have been received. In this example, because k–5 discovery messages were received, the number of discovery messages received does not meet the minimum number of discovery messages needed to reconstruct the user data. As such, the third STA 508 may not attempt reconstruct the user data based on the received discovery messages. In an aspect, to save battery life, the third STA 508 may switch to a dormant mode if the third STA 508 knows that the third STA 508 does not have enough data fragments to reconstruct the user data.

In another aspect, upon receiving a discovery message from the first set of discovery messages 512, the third STA 508 may determine the position of the encoded data fragment within a sequence of encoded data fragments based on a timestamp associated with the data fragment. In this aspect, when the AP 502 transmits a discovery message with an encoded data fragment, the AP 502 may include a timestamp within the discovery message indicating when the discovery message is sent. Based on information received in beacons (e.g., SB or DB), the third STA 508 may know that the NAN 510 has an overall period of 128 DIs. In this aspect, the third STA 508 may assume that one discovery message is transmitted in each DI and the first discovery message is transmitted during the first DI of 128 DIs. When the third STA 508 joins the NAN 510, the third STA 508 may also know an offset value that indicates at which DI of the 128 DIs is currently being used. The third STA 508 may perform a modulo operation on the timestamp using the number of DIs in the overall period (e.g., 128). Based on the result of the modulo operation and the offset associated with the third STA 508, the third STA 508 may determine the position of the encoded data fragment. As such, a timestamp provides an alternative method for determining the position of an encoded data fragment.

In another aspect, if the third STA 508 receives the 57$^{th}$ encoded data fragment of 128 data fragments upon joining the NAN 510 (e.g., determined based on a timestamp or based on a fragment index), then the third STA 508 may enter a sleep mode because the third STA 508 knows that the third STA 508 will not be able to receive the minimum number of data fragments required to reconstruct the user data. The third STA 508 may awaken at the next overall period (e.g., at the start of another 128 DIs).

In another aspect, if a STA (e.g., the first STA 504) has already received k data fragments, which may be the minimum number of fragments to reconstruct the user data, then the STA may reconstruct the user data based on the k data fragments and ignore other data fragments associated with the user data.

In yet another aspect, the first STA 504 may have user data to transmit. The first STA 504 may encode the user data in a second set of data fragments, and transmit each data fragment of the second set of data fragments in a second set of discovery messages 514. The second set of discovery messages 514 may include n discovery messages, k user data fragments, and r repair data fragments. The first STA 504 may insert each data fragment into an IE that includes an identifier field indicating that the IE contains data fragments in the discovery message and that includes an encoding parameter field indicating the values n, k, and r. The second STA 506 may receive the n discovery messages of the second set of discovery messages 514 and reconstruct the user data from the first STA 504.

In another aspect, any wireless device (e.g., a STA or an AP) within the NAN 510 may transmit user data in discovery messages and receive user data in discovery messages.

In another aspect, although user data is transmitted in discovery messages, the user data may also be transmitted in other periodic messages.

Figure 6:
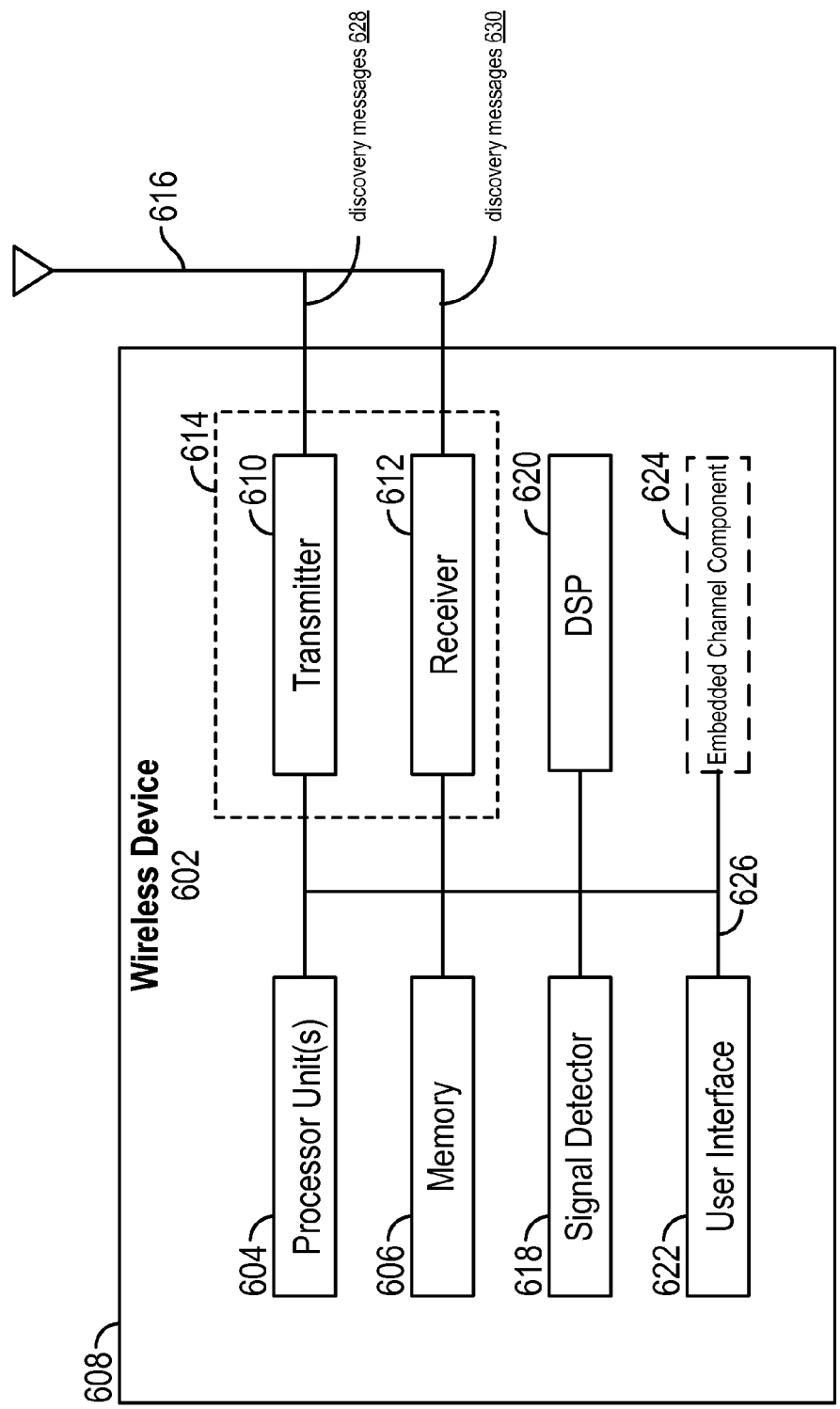
FIG. 6 shows an example functional block diagram of a wireless device that may transmit or receive user data in an embedded data channel over discovery messages within the wireless communication system of FIG. 1.

FIG. 6 shows an example functional block diagram of a wireless device 602 that may transmit or receive user data in an embedded data channel over discovery messages within the wireless communication system 100 of FIG. 1. The wireless device 602 is an example of a device that may be configured to implement the various methods described herein. For example, the wireless device 602 may comprise one of the STAs 112, 114, 116, and 118 or the AP 104.

The wireless device 602 may include a processor 604 which controls operation of the wireless device 602. The processor 604 may also be referred to as a central processing unit (CPU). Memory 606, which may include both read-only memory (ROM) and random access memory (RAM), may provide instructions and data to the processor 604. A portion of the memory 606 may also include non-volatile random access memory (NVRAM). The processor 604 typically performs logical and arithmetic operations based on program instructions stored within the memory 606. The instructions in the memory 606 may be executable (by the processor 604, for example) to implement the methods described herein.

The processor 604 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 602 may also include a housing 608, and the wireless device 602 may include a transmitter 610 and/or a receiver 612 to allow transmission and reception of data between the wireless device 602 and a remote device. The transmitter 610 and the receiver 612 may be combined into a transceiver 614. An antenna 616 may be attached to the housing 608 and electrically coupled to the transceiver 614. The wireless device 602 may also include multiple transmitters, multiple receivers, multiple transceivers, and/or multiple antennas.

The wireless device 602 may also include a signal detector 618 that may be used to detect and quantify the level of signals received by the transceiver 614 or the receiver 612. The signal detector 618 may detect such signals as total energy, energy per subcarrier per symbol, power spectral density, and other signals. The wireless device 602 may also include a DSP 620 for use in processing signals. The DSP 620 may be configured to generate a packet for transmission. In some aspects, the packet may comprise a physical layer convergence procedure (PLCP) protocol data unit (PPDU).

The wireless device 602 may further comprise a user interface 622 in some aspects. The user interface 622 may comprise a keypad, a microphone, a speaker, and/or a display. The user interface 622 may include any element or component that conveys information to a user of the wireless device 602 and/or receives input from the user.

When the wireless device 602 is implemented as a STA (e.g., the STA 114 or the first STA 504) or as an AP (e.g., AP 104 or AP 502), the wireless device 602 may include a embedded channel component 624. In one configuration, the embedded channel component 624 may be configured to transmit encoded user data over discovery messages. In this configuration, the embedded channel component 624 may be configured to encode user data into a set of data fragments and to transmit each data fragment of the set of data fragments in a number of discovery messages (e.g., discovery messages 628). In an aspect, the set of data fragments may include a subset of user data fragments and a subset of repair data fragments. The user data may be of size S, the set of data fragments may have n fragments, the subset of user data fragments may have k fragments, and the subset of repair data fragments may have r fragments such that k+r=n. In another aspect, the encoded user data may be of S', and $$S' = S + \left(S \times \frac{r}{k}\right).$$

In another aspect, the number of discovery messages may be a set of n discovery messages, and all of the encoded user data may be transmitted after the set of n discovery messages is transmitted. In another aspect, each discovery message of the number of discovery messages may include a set of encoding parameters associated with the encoded user data. In another aspect, the number of discovery messages may enable discovery of a network or of a service within the network. In another aspect, the number of discovery messages may be transmitted periodically and the number of discovery messages may be beacon frames. In another aspect, the user data may be encoded using erasure codes. In another aspect, the embedded channel component 624 may transmit each data fragment by inserting each data fragment into an information element and by transmitting the information element containing the data fragment in a discovery message. In another aspect, the information element may be a vendor specific attribute information element.

In another configuration, the embedded channel component 624 may be configured to receive encoded user data over discovery messages (e.g., discovery messages 630). In this configuration, the embedded channel component 624 may be configured to receive one or more discovery messages. The embedded channel component 624 may be configured to determine whether each of the one or more discovery messages includes an encoded data fragment of a set of encoded data fragments associated with user data. The embedded channel component 624 may be configured to determine whether a minimum number of encoded data fragments have been received from the received one or more discovery messages to enable reconstruction of the user data. The embedded channel component 624 may be configured to reconstruct the user data based on the determination of whether the minimum number of encoded data fragments is received. In an aspect, the set of encoded data fragments may include a subset of user data fragments and a subset of repair data fragments. In this aspect, the user data may be of size S, the set of encoded data fragments may have n fragments, the subset of user data fragments may have k fragments, and the subset of repair data fragments may have r fragments such that k+r=n, and the minimum number of encoded data fragments may be less than n. In another aspect, each discovery message of the one or more discovery messages may include a set of encoding parameters associated with the set of encoded data fragments. In another aspect, the one or more discovery messages may be received periodically, and the one or more discovery messages may be beacon frames. In another aspect, the embedded channel component 624 may be configured to reconstruct the user data by combining each of the encoded data fragments in the received one or more discovery messages and by decoding the combined encoded data fragments to reconstruct the user data. In another aspect, the one or more discovery messages may enable discovery of a network or of a service within the network.

The various components of the wireless device 602 may be coupled together by a bus system 626. The bus system 626 may include a data bus, for example, as well as a power bus, a control signal bus, and a status signal bus in addition to the data bus. Components of the wireless device 602 may be coupled together or accept or provide inputs to each other using some other mechanism.

Although a number of separate components are illustrated in FIG. 6, one or more of the components may be combined or commonly implemented. For example, the processor 604 may be used to implement not only the functionality described above with respect to the processor 604, but also to implement the functionality described above with respect to the signal detector 618, the DSP 620, the user interface 622, and/or the embedded channel component 624. Further, each of the components illustrated in FIG. 6 may be implemented using a plurality of separate elements.

Figure 7:
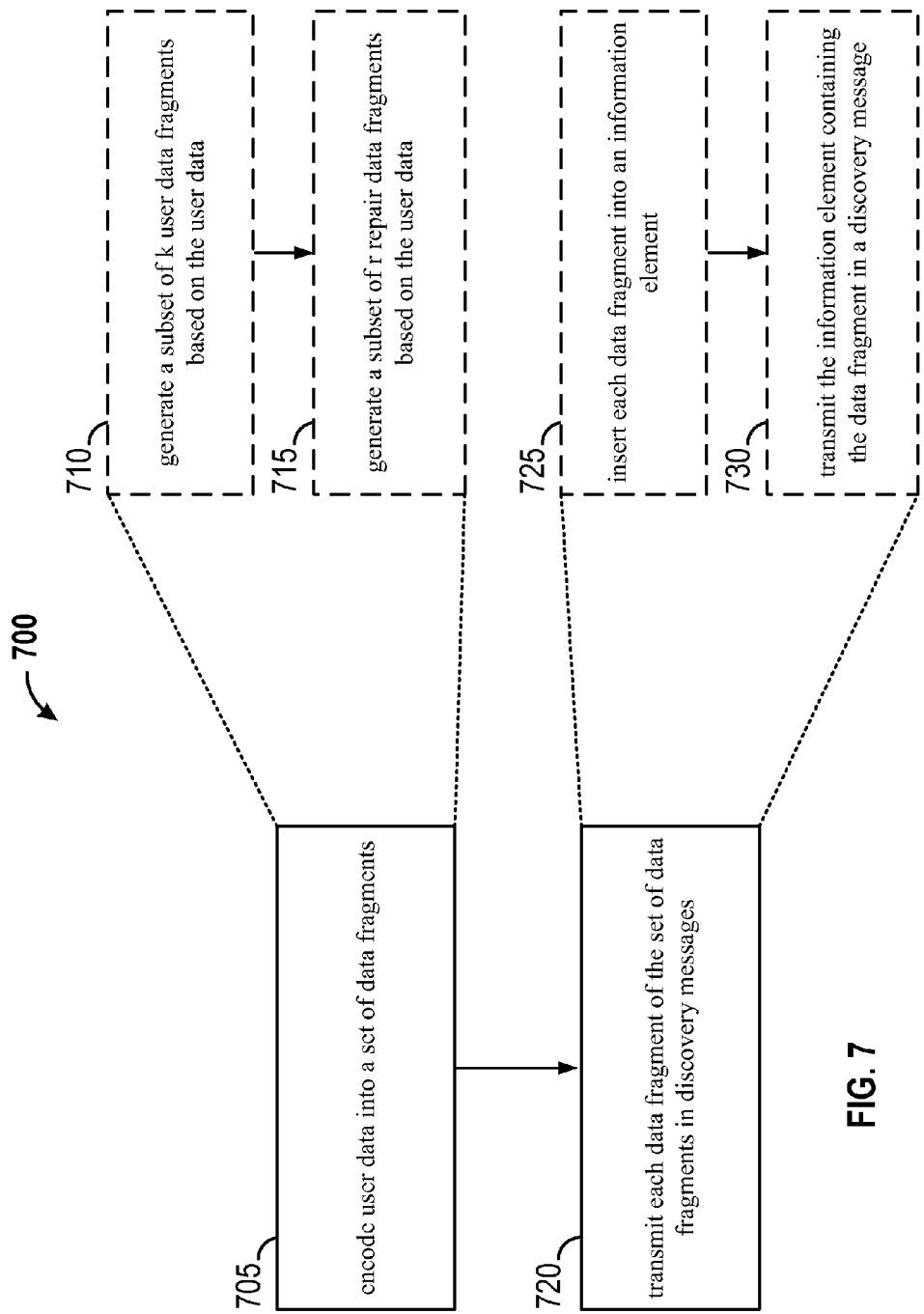
FIG. 7 is a flowchart of an example method of transmitting user data over periodic discovery messages.

FIG. 7 is a flowchart of an example method 700 of transmitting user data over periodic discovery messages. The method 700 may be performed using an apparatus (e.g., the STA 114, the first STA 504, the AP 502, or the wireless device 602, for example). Although the method 700 is described below with respect to the elements of wireless device 602 of FIG. 6, other components may be used to implement one or more of the operations described herein. The dotted lines represent optional operations.

At block 705, the apparatus may encode user data into a set of data fragments. In an aspect, the apparatus may encode the user data by generating a subset of k user data fragments based on the user data, at block 710, and by generating a subset of r repair data fragments based on the user data, at block 715. For example, referring to FIG. 5, the AP 502 may encode user data (e.g., class scheduling information) into a set of data fragments. The AP 502 may generate a subset of k user data fragments and a subset of r repair data fragments. The k user data fragments may represent all of the user data for transmission, and the r repair data fragments may be repair data that may be used in case any of the k user data fragments are not received or received with errors.

At block 720, the apparatus may transmit each data fragment of the set of data fragments in discovery messages. In an aspect, the apparatus may transmit each data fragment by inserting each data fragment into an information element, at block 725, and by transmitting the information element containing the data fragment in a discovery messages, at block 730. For example, referring to FIG. 5, the AP 502 may transmit each data fragment of the set of data fragments in the first set of discovery messages 512. The AP 502 may transmit each data fragment by inserting each data fragment into an IE. The IE may indicate, in the identifier field, that the IE has a data fragment for transmission over a discovery message. The IE may include a fragment field indicating the position of the data fragment within the set of data fragments. The AP 502 may transmit the IE containing the data fragment in a discovery message of the first set of discovery messages 512.

Figure 8:
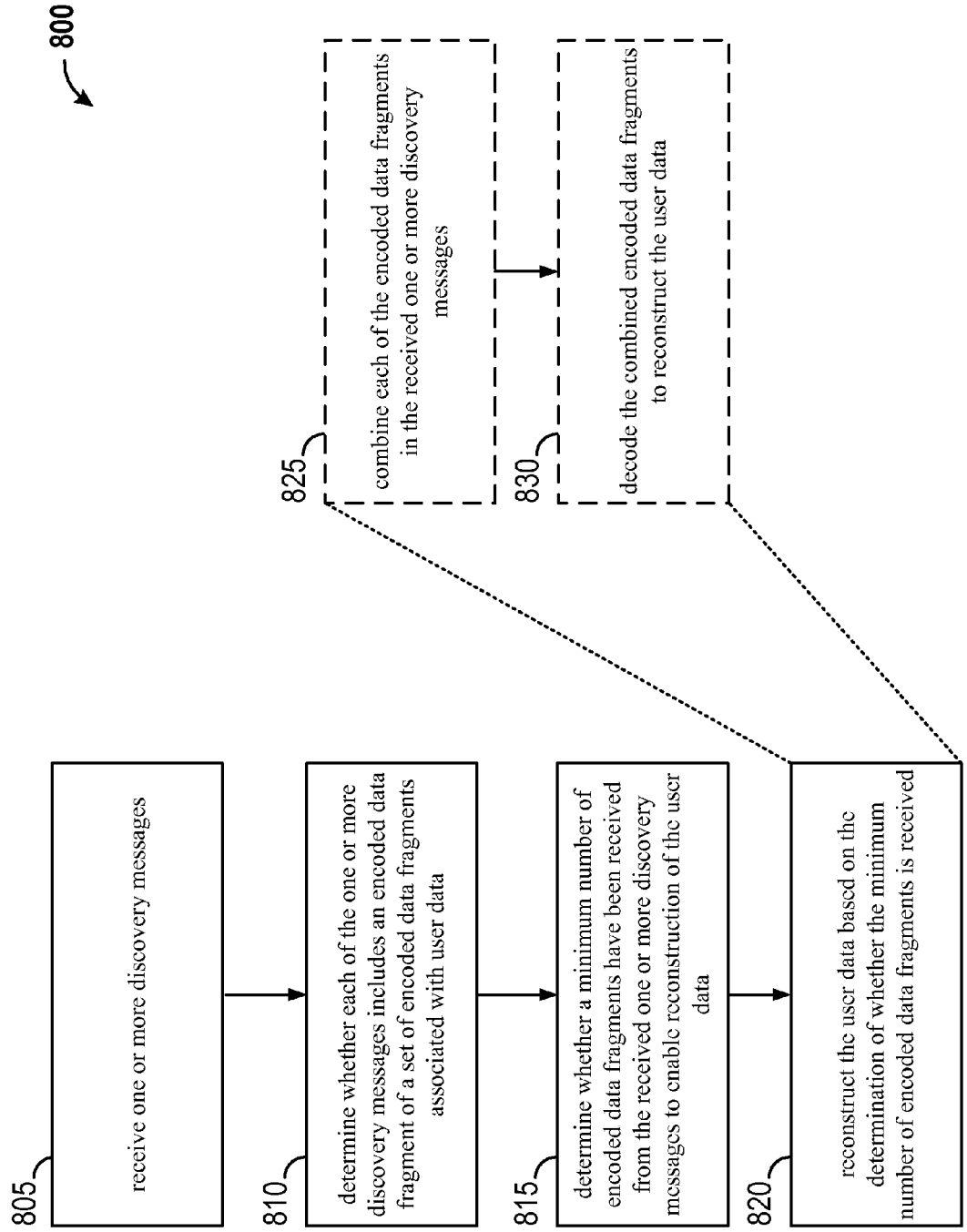
FIG. 8 is a flowchart of an example method of receiving user data over periodic discovery messages.

FIG. 8 is a flowchart of an example method 800 of receiving user data over periodic discovery messages. The method 800 may be performed using an apparatus (e.g., the STA 114, the first STA 504, the AP 502, or the wireless device 602, for example). Although the method 800 is described below with respect to the elements of wireless device 602 of FIG. 6, other components may be used to implement one or more of the operations described herein. The dotted lines represent optional operations.

At block 805, the apparatus may receive one or more discovery messages. For example, referring to FIG. 5, the first STA 504 may receive one or more discovery messages of the first set of discovery messages 512.

At block 810, the apparatus may determine whether each of the one or more discovery messages includes an encoded data fragment of a set of encoded data fragments associated with user data. For example, referring to FIG. 5, the first STA 504 may determine whether each of the received one or more discovery messages includes an encoded data fragment of a set of encoded data fragments associated with user data. In one configuration, the first STA 504 may determine whether each of the received one or more discovery messages is an IE type that includes an encoded data fragment included with the IE. In this aspect, if the first STA 504 determines that an identifier field is associated with an IE type that includes an encoded data fragment, then the first STA 504 may determine that the discovery message includes the encoded data fragment. But if the first STA 504 does not identify the identifier field in the discovery message, or the value in the identifier field does not indicate that an encoded data fragment is present, then the first STA 504 may determine that the discovery message does not have an encoded data fragment. In another configuration, the first STA 504 may determine whether each of the received one or more discovery messages includes a VSA IE that includes an encoded data fragment. If such a VSA IE is present, then an encoded data fragment may be present; otherwise, the encoded data fragment may not be present.

At block 815, the apparatus may determine whether a minimum number of encoded data fragments have been received from the received one or more discovery messages to enable reconstruction of the user data. For example, referring to FIG. 5, the first STA 504 may determine whether a minimum number of encoded data fragments have been received from the received one or more discovery messages in the first set of discovery messages 512 to enable reconstruction of the user data. The first STA 504 may determine the minimum number of encoded data fragments needed to reconstruct the data. In an aspect, the minimum number of encoded data fragments may be indicated in the IE of the discovery message (e.g., a minimum number field or an encoding parameters field). In another aspect, the minimum number of encoded data fragments may be preconfigured (e.g., different types of discovery messages have a different minimum number of data fragment requirement). The first STA 504 may then count the number of received data fragments and determine if the number of received data fragments is greater than, less than, or equal to the minimum number.

At block 820, the apparatus may reconstruct the user data based on the received minimum number of encoded data fragments. For example, referring to FIG. 5, the first STA 504 may reconstruct the user data based on whether the minimum number of encoded data fragments is received. If the minimum number has not been received, the first STA 504 may not reconstruct the user data. If the minimum number has been received, the first STA 504 may reconstruct the user data.

In as aspect, at block 825, the apparatus may reconstruct the user data by combining each of the encoded data fragments in the received one or more discovery messages. At block 830, the apparatus may decode the combined encoded data fragments to reconstruct the user data. For example, referring to FIG. 5, if the minimum number of data fragments is received, the first STA 504 may reconstruct the user data by combining the received encoded data fragments and by decoding the combined encoded data fragments to reconstruct the user data.

Figure 9:
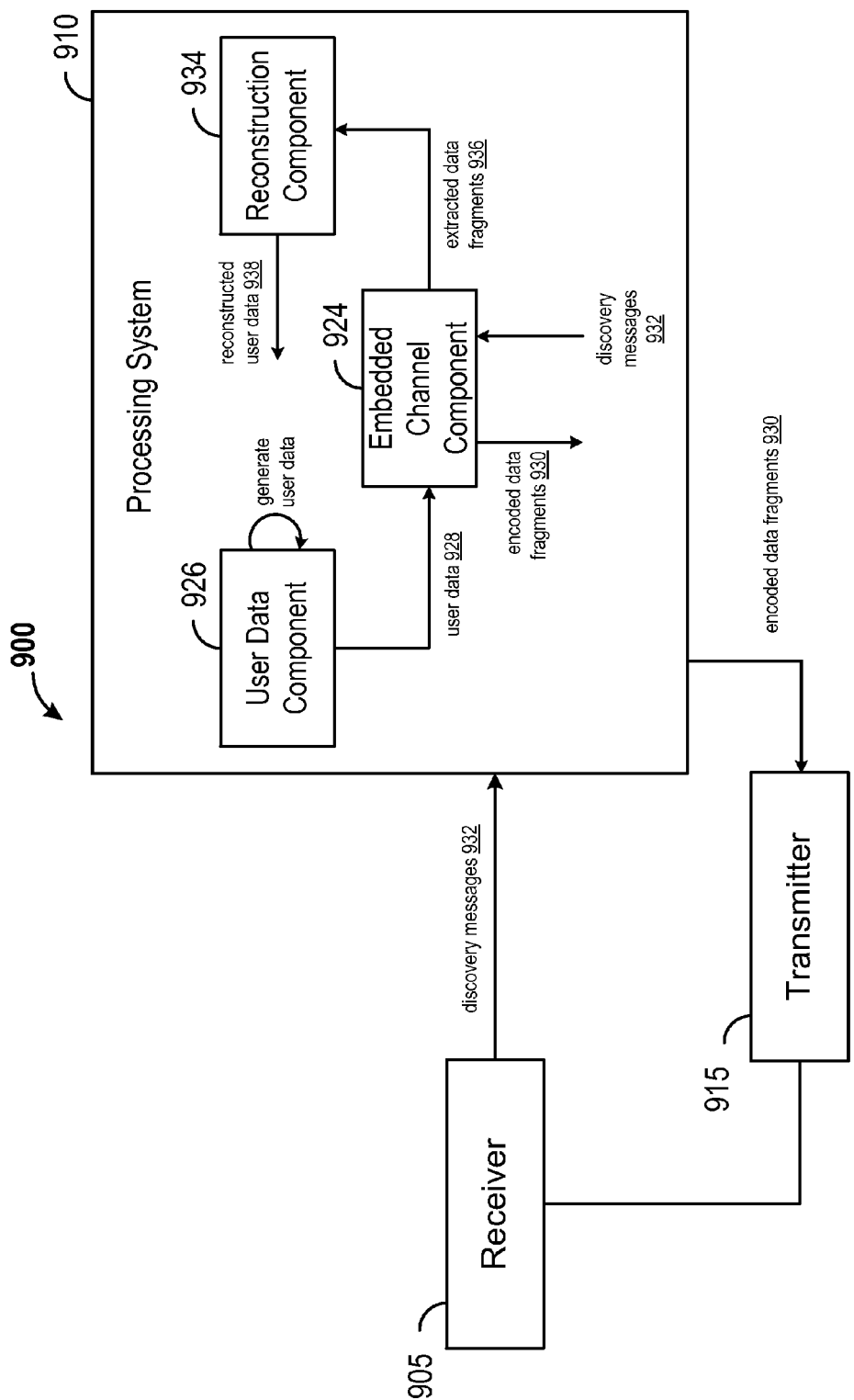
FIG. 9 is a functional block diagram of an example wireless communication device that utilizes an embedded data channel in discovery messages.

FIG. 9 is a functional block diagram of an example wireless communication device 900 that utilizes an embedded data channel in discovery messages. The wireless communication device 900 may include a receiver 905, a processing system 910, and a transmitter 915. The processing system 910 may include an embedded channel component 924, a user data component 926, and/or a reconstruction component 934. In one configuration, the wireless communication device 900 may be configured to transmit user data in an embedded channel over discovery messages. The user data (e.g., user data 928) may be generated by the user data component 926. In this configuration, the processing system 910 and/or the embedded channel component 924 may be configured to encode user data into a set of data fragments (e.g., encoded data fragments 930). The processing system 910, the embedded channel component 924, and/or the transmitter 915 may be configured to transmit each data fragment of the set of data fragments in a number of discovery messages. In an aspect, the set of data fragments may include a subset of user data fragments and a subset of repair data fragments. The user data may be of size S, the set of data fragments may have n fragments, the subset of user data fragments may have k fragments, and the subset of repair data fragments may have r fragments such that k+r=n. In another aspect, the encoded user data may be of S', and $$S' = S + \left(S \times \frac{r}{k}\right).$$

In another aspect, the number of discovery messages may be a set of n discovery messages, and all of the encoded user data may be transmitted after the set of n discovery messages is transmitted. In another aspect, each discovery message of the number of discovery messages may include a set of encoding parameters associated with the encoded user data. In another aspect, the number of discovery messages may enable discovery of a network or of a service within the network. In another aspect, the number of discovery messages may be transmitted periodically and the number of discovery messages may be beacon frames. In another aspect, the user data may be encoded using erasure codes. In another aspect, the processing system 910, the embedded channel component 924, and/or the transmitter 915 may transmit each data fragment by inserting each data fragment into an information element and by transmitting the information element containing the data fragment in a discovery message. In another aspect, the information element may be a vendor specific attribute information element.

In another configuration, the wireless communication device 900 may be configured to receive encoded user data in an embedded channel over discovery messages (e.g., discovery messages 932). In this configuration, the processing system 910, the embedded channel component 924, and/or the receiver 905 may be configured to receive one or more discovery messages. The processing system 910 and/or the embedded channel component 924 may be configured to determine whether each of the one or more discovery messages includes an encoded data fragment of a set of encoded data fragments associated with user data. The processing system 910 and/or the embedded channel component 924 may be configured to determine whether a minimum number of encoded data fragments have been received from the received one or more discovery messages to enable reconstruction of the user data. The processing system 910, the embedded channel component 924, and/or the reconstruction component 934 may be configured to reconstruct the user data based on the determination of whether the minimum number of encoded data fragments is received. In an aspect, the set of encoded data fragments (e.g., extracted data fragments 936) may include a subset of user data fragments and a subset of repair data fragments. In this aspect, the user data may be of size S, the set of encoded data fragments may have n fragments, the subset of user data fragments may have k fragments, and the subset of repair data fragments may have r fragments such that k+r=n, and the minimum number of encoded data fragments may be less than n. In another aspect, each discovery message of the one or more discovery messages may include a set of encoding parameters associated with the set of encoded data fragments. In another aspect, the one or more discovery messages may be received periodically, and the one or more discovery messages may be beacon frames. In another aspect, the processing system 910, the embedded channel component 924, and/or the reconstruction component 934 may be configured to reconstruct the user data (e.g., reconstructed user data 938) by combining each of the encoded data fragments in the received one or more discovery messages and by decoding the combined encoded data fragments to reconstruct the user data. In another aspect, the one or more discovery messages may enable discovery of a network or of a service within the network.

The receiver 905, the processing system 910, the embedded channel component 924, and/or the transmitter 915 may be configured to perform one or more functions discussed above with respect to blocks 705, 710, 715, 720, 725, 730 of FIG. 7 and/or blocks 805, 810, 815, 820, 825, 830 of FIG. 8. The receiver 905 may correspond to the receiver 612. The processing system 910 may correspond to the processor 604.

The transmitter 915 may correspond to the transmitter 610. The embedded channel component 924 may correspond to the embedded channel component 126, the embedded channel component 124, and/or the embedded channel component 624.

In one configuration, the wireless communication device 900 may include means for encoding user data into a set of data fragments. The wireless communication device 900 may include means for transmitting each data fragment of the set of data fragments in a plurality of discovery messages. In an aspect, the set of data fragments may include a subset of user data fragments and a subset of repair data fragments, and the user data may be of size S, the set of data fragments may have n fragments, the subset of user data fragments may have k fragments, the subset of repair data fragments may have r fragments, and k+r=n. In another aspect, if the plurality of discovery messages are discovery beacons, then k=288, r=96, and n=384. In another aspect, if the plurality of discovery messages are service beacons, then k=96, r=32, and n=128. In another aspect, if the plurality of discovery messages are service discovery messages, then k=96, r=32, and n=128. In another aspect, the encoded user data may be of size S', and $$S' = S + \left(S \times \frac{r}{k}\right).$$

In another aspect, the plurality of discovery messages may be a set of n discovery messages, and all of the encoded user data is transmitted after the set of n discovery messages is transmitted. In another aspect, each discovery message of the plurality of discovery messages may include a set of encoding parameters associated with the encoded user data. In another aspect, the plurality of discovery messages may enable discovery of a network or of a service within the network. In another aspect, the plurality of discovery messages may be transmitted periodically and the plurality of discovery messages comprises beacon frames. In another aspect, the user data may be encoded using erasure codes. In another aspect, the means for transmitting may be configured to insert each data fragment into an information element and to transmit the information element containing the data fragment in a discovery message. In another aspect, the user data may include a device listing that indicates all wireless devices publishing or subscribing within a NAN associated with the wireless device, a device-to-resource mapping link, a list of recently connected NAN devices or service identifiers, or data not used for network or service discovery. In another aspect, each discovery message of the plurality of discovery messages may include an identifier field indicating that the data fragment is being transmitted with each discovery message of the plurality of discovery messages.

For example, means for encoding user data may include the processing system 910 and/or the embedded channel component 924. Means for transmitting each data fragment may include the processing system 910, the embedded channel component 924, and/or the transmitter 915.

In one configuration, the wireless communication device 900 may include means for receiving one or more discovery messages. The wireless communication device 900 may include means for determining whether each of the received one or more discovery messages includes an encoded data fragment of a set of encoded data fragments associated with user data. The wireless communication device 900 may include means for determining whether a minimum number of encoded data fragments have been received from the received one or more discovery messages to enable reconstruction of the user data. The wireless communication device 900 may include means for reconstructing the user data based on the determination of whether the minimum number of encoded data fragments is received. In an aspect, the means for determining whether each of the received one or more discovery messages includes an encoded data fragment may be configured to determine whether each of the received one or more discovery messages includes an identifier field indicating that the encoded data fragment is being transmitted with each of the received one or more discovery messages and to determine a value associated with the identifier field to determine whether the encoded data fragment is present. In another aspect, the set of encoded data fragments may include a subset of user data fragments and a subset of repair data fragments. In another aspect, the user data may be of size S, the set of encoded data fragments may have n fragments, the subset of user data fragments may have k fragments, the subset of repair data fragments may have r fragments, k+r=n, and the minimum number of encoded data fragments may be less than n. In another aspect, each discovery message of the one or more discovery messages may include a set of encoding parameters associated with the set of encoded data fragments. In another aspect, one or more discovery messages may be received periodically, and the one or more discovery messages may include beacon frames. In another aspect, means for reconstructing the user data may be configured to combine each of the encoded data fragments in the received one or more discovery messages and to decode the combined encoded data fragments to reconstruct the user data. In another aspect, the one or more discovery messages may enable discovery of a network or of a service within the network.

For example, means for receiving one or more discovery messages may include the processing system 910, the embedded channel component 924, and/or the receiver 905. Means for determining whether each of the received one or more discovery messages comprises an encoded data fragment may include the processing system 910 and/or the embedded channel component 924. Means for determining whether a minimum number of encoded data fragments have been received may include the processing system 910 and/or the embedded channel component 924. Means for reconstructing the user data may include the processing system 910 and/or the embedded channel component 924.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an application specific integrated circuit (ASIC), an FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD)-ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus computer-readable medium comprises a non-transitory computer readable medium (e.g., tangible media).

The methods disclosed herein comprise one or more operations or actions for achieving the described method. The method operations and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication by a wireless device, comprising:
   encoding user data unrelated to discovery into a set of data fragments; and
   transmitting a plurality of discovery messages, wherein each respective discovery message of the plurality of discovery messages includes a respective data fragment of the set of data fragments.

2. The method of claim 1, wherein the set of data fragments comprises a subset of user data fragments and a subset of repair data fragments, and wherein the set of data fragments has n fragments, the subset of user data fragments has k fragments, the subset of repair data fragments has r fragments, and k+r=n.

3. The method of claim 2, wherein if:
   the plurality of discovery messages comprises discovery beacons, then k=288, r=96, and n=384;
   the plurality of discovery messages comprises service beacons, then k=96, r=32, and n=128; or
   the plurality of discovery messages comprises service discovery messages, then k=96, r=32, and n=128.

4. The method of claim 2, wherein the user data is of size S and the encoded user data is of size S', and wherein $$S' = S + \left(S \times \frac{r}{k}\right).$$

5. The method of claim 1, wherein the plurality of discovery messages is a set of n discovery messages, and all of the encoded user data is transmitted after the set of n discovery messages is transmitted.

6. The method of claim 1, wherein each discovery message of the plurality of discovery messages includes a set of encoding parameters associated with the encoded user data.

7. The method of claim 1, wherein the plurality of discovery messages are of different types, and wherein the plurality of discovery messages of different types includes a first type of discovery message and a second type of discovery message that is different from the first type of discovery message.

8. The method of claim 1, wherein the plurality of discovery messages is transmitted periodically and the plurality of discovery messages comprises beacon frames.

9. The method of claim 1, wherein the user data is encoded using erasure codes.

10. The method of claim 1, wherein each respective discovery message of the plurality of discovery messages includes a respective information element that includes the respective data fragment included in the respective discovery message.

11. The method of claim 1, wherein the user data comprises a device listing that indicates all wireless devices publishing or subscribing within a neighbor awareness network (NAN) associated with the wireless device, a device-to-resource mapping link, or a list of recently connected NAN devices or service identifiers.

12. The method of claim 1, wherein each respective discovery message of the plurality of discovery messages includes a respective identifier field that indicates the presence of the respective data fragment included in the respective discovery message data fragment.

13. A method of wireless communication by a wireless device, comprising:
    receiving a plurality of discovery messages, wherein each respective discovery message of the plurality of discovery messages includes a respective encoded data fragment of a set of encoded data fragments associated with user data unrelated to discovery;
    determining whether a minimum number of encoded data fragments have been received to enable reconstruction of the user data unrelated to discovery; and
    reconstructing the user data unrelated to discovery based on the determination of whether the minimum number of encoded data fragments have been received.

14. The method of claim 13, wherein each respective discovery message of the plurality of discovery messages includes a respective identifier field that indicates the presence of the respective data fragment included in the respective discovery message.

15. The method of claim 13, wherein the set of encoded data fragments comprises a subset of user data fragments and a subset of repair data fragments.

16. The method of claim 15, wherein the set of encoded data fragments has n fragments, the subset of user data fragments has k fragments, the subset of repair data fragments has r fragments, k+r=n, and the minimum number of encoded data fragments is less than n.

17. The method of claim 13, wherein each discovery message of the plurality of discovery messages includes a set of encoding parameters associated with the set of encoded data fragments.

18. The method of claim 13, wherein the plurality of discovery messages are received periodically, and the plurality of discovery messages comprises beacon frames.

19. The method of claim 13, wherein reconstructing the user data comprises:
    combining at least the minimum number of received encoded data fragments; and
    decoding the combined encoded data fragments to reconstruct the user data.

20. The method of claim 13, wherein the plurality of discovery messages are of different types, and wherein the plurality of discovery messages of different types includes a first type of discovery message and a second type of discovery message that is different from the first type of discovery message.

21. An apparatus for wireless communication, comprising:
a memory; and
at least one processor coupled to the memory, wherein the at least one processor is configured to:
encode user data unrelated to discovery into a set of data fragments; and
transmit a plurality of discovery messages, wherein each respective discovery message of the plurality of discovery messages includes a respective data fragment of the set of data fragments.

22. The apparatus of claim 21, wherein the set of data fragments comprises a subset of user data fragments and a subset of repair data fragments, and wherein the set of data fragments has n fragments, the subset of user data fragments has k fragments, the subset of repair data fragments has r fragments, and k+r=n.

23. The apparatus of claim 22, wherein the user data is of size S and the encoded user data is of size S', and wherein $$S' = S + \left(S \times \frac{r}{k}\right).$$

24. The apparatus of claim 21, wherein each discovery message of the plurality of discovery messages includes a set of encoding parameters associated with the encoded user data.

25. The apparatus of claim 21, wherein each respective discovery message of the plurality of discovery messages includes a respective information element that includes the respective data fragment included in the respective discovery message.

26. An apparatus for wireless communication, comprising:
a memory; and
at least one processor coupled to the memory, wherein the at least one processor is configured to:
receive a plurality of discovery messages, wherein each respective discovery message of the plurality of discovery messages includes a respective encoded data fragment of a set of encoded data fragments associated with user data unrelated to discovery;
determine whether a minimum number of encoded data fragments have been received to enable reconstruction of the user data unrelated to discovery; and
reconstruct the user data unrelated to discovery based on the determination of whether the minimum number of encoded data fragments have been received.

27. The apparatus of claim 26, wherein the set of encoded data fragments comprises a subset of user data fragments and a subset of repair data fragments.

28. The apparatus of claim 27, wherein the set of encoded data fragments has n fragments, the subset of user data fragments has k fragments, the subset of repair data fragments has r fragments, k+r=n, and the minimum number of encoded data fragments is less than n.

29. The apparatus of claim 26, wherein each discovery message of the plurality of discovery messages includes a set of encoding parameters associated with the set of encoded data fragments.

30. The apparatus of claim 26, wherein to reconstruct the user data, the at least one processor is configured to:
combine at least the minimum number of received encoded data fragments; and
decode the combined encoded data fragments to reconstruct the user data.

* * * * *